United States Patent
Heuer

(10) Patent No.: US 9,248,912 B2
(45) Date of Patent: Feb. 2, 2016

(54) METHOD AND SYSTEM FOR EMERGENCY VENTILATION OF AN AIRCRAFT CABIN

(75) Inventor: Thomas Heuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1149 days.

(21) Appl. No.: 13/127,803

(22) PCT Filed: Oct. 26, 2009

(86) PCT No.: PCT/EP2009/007648
§ 371 (c)(1),
(2), (4) Date: Jun. 29, 2011

(87) PCT Pub. No.: WO2010/051920
PCT Pub. Date: May 14, 2010

(65) Prior Publication Data
US 2011/0306285 A1    Dec. 15, 2011

Related U.S. Application Data

(60) Provisional application No. 61/112,209, filed on Nov. 7, 2008.

(30) Foreign Application Priority Data

Nov. 7, 2008    (DE) .......................... 10 2008 056 417

(51) Int. Cl.
*B64D 13/00*    (2006.01)
*B64D 13/02*    (2006.01)

(52) U.S. Cl.
CPC . *B64D 13/02* (2013.01); *Y02T 50/56* (2013.01)

(58) Field of Classification Search
CPC ................................ B64D 13/00; B64D 13/02
USPC .......................................... 454/71, 72, 76, 73
See application file for complete search history.

(56) References Cited

U.S. PATENT DOCUMENTS

| 3,101,918 A | * 8/1963 | Evelyn | B64D 13/02 244/76 R |
| 5,105,729 A | 4/1992 | Signoret et al. | |

(Continued)

FOREIGN PATENT DOCUMENTS

| CN | 101107166 | 1/2008 |
| DE | 4425871 | 2/1996 |

(Continued)

OTHER PUBLICATIONS

European Patent Office, International Search Report, Form PCT/ISA/210 (4 pgs.), and Written Decision of the International Search Authority, Form PCT/ISA/237 (6 pgs.), Jun. 29, 2010.

(Continued)

*Primary Examiner* — Alissa Tompkins
*Assistant Examiner* — Brittany Towns
(74) *Attorney, Agent, or Firm* — Wood, Herron & Evans, LLP

(57) ABSTRACT

A method for emergency ventilation of an aircraft cabin is provided. The method includes controlling a first valve to supply air from the aircraft environment into a first aircraft fuselage area through the opened first valve and into the aircraft cabin. The method further includes controlling a second valve to conduct air from the aircraft cabin into a second aircraft fuselage area and out to the aircraft environment through the opened second valve. In their normal operation, the first and second valves serve as air outlet valves of an aircraft cabin pressure control system. The method further includes controlling a recirculation fan of an air-conditioning system to draw air supplied through the first valve into a mixing chamber of the air-conditioning system and to direct air from the mixing chamber into the aircraft cabin.

8 Claims, 1 Drawing Sheet

(56) References Cited

U.S. PATENT DOCUMENTS

| | | | |
|---|---|---|---|
| 5,939,800 A * | 8/1999 | Artinian et al. | 307/64 |
| 6,159,091 A | 12/2000 | Horstman et al. | |
| 6,389,826 B2 * | 5/2002 | Buchholz et al. | 62/172 |
| 6,676,504 B2 * | 1/2004 | Petri et al. | 454/72 |
| 7,837,541 B2 * | 11/2010 | Gray | B64D 13/04 244/118.5 |
| 2003/0132344 A1 | 7/2003 | Johnson et al. | |
| 2008/0283663 A1 * | 11/2008 | Space et al. | 244/118.5 |
| 2008/0315043 A1 * | 12/2008 | Baumann | 244/53 B |
| 2009/0291625 A1 | 11/2009 | Klimpel et al. | |
| 2010/0096503 A1 * | 4/2010 | Tanner et al. | 244/129.4 |
| 2011/0136425 A1 * | 6/2011 | Eichholz et al. | 454/76 |
| 2013/0059516 A1 * | 3/2013 | Horner et al. | 454/71 |

FOREIGN PATENT DOCUMENTS

| | | |
|---|---|---|
| EP | 0693423 | 1/1996 |
| GB | 534524 | 3/1941 |
| GB | 2443964 | 5/2008 |
| WO | 2007054206 | 5/2007 |

OTHER PUBLICATIONS

Chinese Patent Office, Office Action, English Language Summary of the First Office Action (6 pgs.), Dec. 5, 2012.

\* cited by examiner

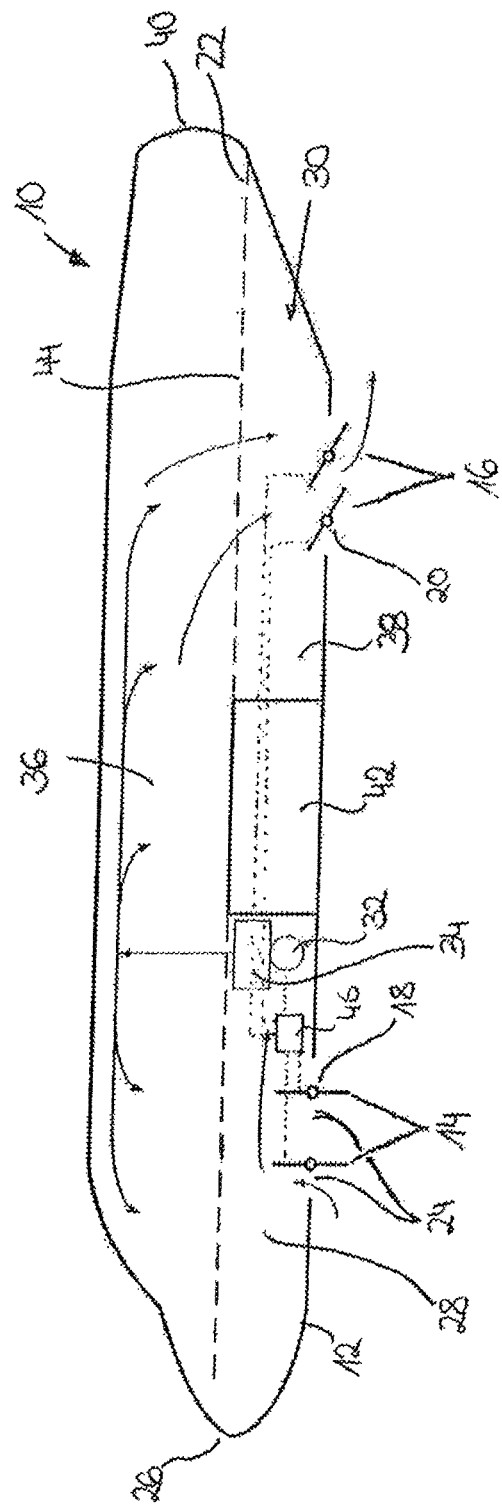

METHOD AND SYSTEM FOR EMERGENCY VENTILATION OF AN AIRCRAFT CABIN

This application claims priority under Section 371 and/or as a continuation under Section 120 to PCT Application No. PCT/EP2009/007648, filed on Oct. 26, 2009, which claims priority to German Application No. 10 2008 056417.6 and U.S. Provisional Application No. 61/112,209, both filed on Nov. 7, 2008.

TECHNICAL FIELD

The invention relates to a method for emergency ventilation of an aircraft cabin in case the aircraft cabin cannot be supplied with the necessary breathable air owing to a fault in an aircraft air-conditioning system. The invention further relates to a system for emergency ventilation of an aircraft cabin.

BACKGROUND

In an aircraft cabin, an aircraft air-conditioning system usually ensures a necessary air exchange and controls the cabin pressure and cabin temperature. The term aircraft cabin is to be understood here as all areas of the aircraft which are to be ventilated during normal operation of an aircraft, such as, for example, a cockpit, a passenger cabin, crew areas, and cargo compartments which are to be ventilated. In large passenger aircraft with several engines, two redundant air-conditioning units which are independent of one another and run in parallel are generally provided in order to supply the aircraft cabin with breathable air. These air-conditioning units process engine bleed air and then feed it as process air into a mixing chamber. In the mixing chamber, the process air is mixed with recirculation air which is drawn from the aircraft cabin by suitable recirculation fans. The mixed air produced in the mixing chamber is finally distributed in the aircraft cabin via an air distribution system.

The cabin internal pressure is controlled by means of a cabin pressure control system which comprises controllable air outlet valves arranged in the fuselage of the aircraft. The air outlet valves of the cabin pressure control system are provided in the area of a skin of the aircraft fuselage. To control the cabin internal pressure, these air outlet valves are controlled in accordance with the pressure prevailing in the aircraft cabin and the flight status. A setting angle which these valves enclose with the skin is usually in a range between 0° and 90°. However, the air outlet valves are also drivable in such a way that their setting angle is greater than 90°. On the ground the air outlet valves are usually fully opened for cabin internal pressure reduction, i.e. their setting angle is 90°. During the flight phase, the setting angle of the air outlet valves in their normal operation is usually less than 90°.

If during the flight a fault in the aircraft air-conditioning system arises whereby the aircraft cabin can no longer be supplied with sufficient breathable air, the aircraft descends to a safe altitude and flies unpressurised to the destination airport or to an airfield situated nearer. In order to supply the necessary breathable air for the passengers during this period, it is known to provide aircraft with one or more so-called emergency ram-air inlets. In the event of failure of the aircraft air-conditioning system, an emergency ram-air inlet can be controlled such that ram air is fed from the aircraft environment directly into the air distribution system. In order to guarantee a sufficient breathable air supply, a suitable number of emergency ram-air inlets for the volume of the aircraft cabin are required.

An emergency ram-air inlet is an electrically driven, mechanical component and is therefore prone to faults. For reasons of redundancy, duplicate electrical drives of the emergency ram-air inlet must therefore be present. To control the emergency ram-air inlet, it is necessary to provide a control device which comprises sensors or limit switches in order to detect a limit of travel of the emergency ram-air inlet. Known emergency ram-air inlets are in general manually driven. Consequently, a suitable switch must be present in the cockpit. All additionally required devices and components increase the weight of the aircraft and thus reduce its payload capacity. In addition, each electrical drive of an emergency ram-air inlet has to be supplied with current. This permanently increases the required generator capacity, although the emergency ram-air inlets are driven only very rarely.

SUMMARY OF THE INVENTION

The invention is directed at the object of providing a fuel-saving, reliable method and system for emergency ventilation of an aircraft cabin.

This object is achieved by a method described below and a system described below for emergency ventilation of an aircraft cabin.

The method according to the invention comprises controlling a first valve, arranged in a first aircraft fuselage area and in its normal operation serving as an air outlet valve of an aircraft cabin pressure control system, such that air is supplied from the aircraft environment into the first aircraft fuselage area through the opened first valve and is conducted from the first aircraft fuselage area into the aircraft cabin. According to a further method step, a second valve, arranged in a second aircraft fuselage area spaced apart from the first aircraft fuselage area along a longitudinal axis of the aircraft and in its normal operation serving as an additional air outlet valve of the aircraft cabin pressure control system, is controlled such that air is conducted from the aircraft cabin into the second aircraft fuselage area and is discharged into the aircraft environment through the opened second valve.

By using the first valve, which is provided in the first aircraft fuselage area and produces a local positive pressure, as a ram-air inlet and the second valve, which is provided in the second aircraft fuselage area and produces a local negative pressure, for venting, an emergency ventilation of the passenger cabin takes place. This emergency ventilation is based on the production of local positive pressure (ram pressure) at the first valve and of local negative pressure at the second valve. Air is discharged from the second aircraft fuselage area into the environment through the opened second valve. A negative pressure is thus produced in the second aircraft fuselage area which causes air to flow from the aircraft cabin into the second aircraft fuselage area. Through the outflow of air from the aircraft cabin, a negative pressure is also produced in the aircraft cabin which causes ram air supplied through the opened first valve to flow from the first aircraft fuselage area into the aircraft cabin.

By controlling the first and second valves, serving in normal operation as air outlet valves, for emergency ventilation of the aircraft cabin, the emergency ram-air inlets hitherto additionally provided in aircraft, together with their pipework, the control device required and the cockpit switch can be dispensed with. The air outlet valves of the aircraft cabin pressure control system are present in the aircraft anyway, so that no additional components are required for carrying out the emergency ventilation method according to the invention. The weight of the aircraft is thus not additionally increased.

Since an additional control device can also be dispensed with, energy and therefore fuel is saved.

The first and the second aircraft fuselage area can be arranged in an underfloor area of the aircraft and be spatially separated from one another. This spatial separation is effected, for example, via a centre wing box or else via a simple partition wall. The spatial separation prevents air supplied to the first aircraft fuselage area from flowing directly into the second aircraft fuselage area without leaving the underfloor area of the aircraft in the process. Furthermore, the first aircraft fuselage area can be arranged in a front fuselage area of the aircraft adjacent to an aircraft nose and the second aircraft fuselage area can be arranged in a rear fuselage area adjacent to a tail of the aircraft. The aircraft cabin can be arranged in an over-floor area of the aircraft.

If present, a plurality of valves serving in normal operation as air outlet valves and provided in the first aircraft fuselage area can also be employed in the emergency ventilation method according to the invention as ram-air inlet valves. Likewise, where present, a plurality of valves serving in normal operation as air outlet valves and provided in the second aircraft fuselage area can be used in the method according to the invention as emergency ventilation outlet valves.

The air outlet valves of the cabin pressure control system, which are arranged in the area of the skin of the aircraft, can be formed as valve flaps pivotable about an axis, the pivot axis thereof not being arranged in the area of an edge facing the aircraft nose. In addition, the pivot axes of the valve flaps preferably do not run parallel to the aircraft longitudinal axis. In an advantageous configuration, the pivot axis of the valve flap runs perpendicularly to the aircraft longitudinal axis, it being possible for the pivot axis to correspond to a valve flap centre axis or be arranged in another area of the valve opening. Preferably, however, the pivot axis is arranged such that the opened valve flap serves as air resistance when the aircraft is flying. As a result, the air impinging on the opened valve flap is backed up. The ram pressure arising in this process assists the flow of ram air from the aircraft environment into the first aircraft fuselage area through the first valve.

In order to ensure emergency ventilation of the aircraft cabin, the first valve for supplying ram air from the aircraft environment into the first aircraft fuselage area can be fully opened, and the second valve can be at least partly opened. In the fully opened state of the first valve, the ram-air supply into the first aircraft fuselage area through the first valve is possible, while a partly opened first valve possibly only allows the air discharge from the first aircraft fuselage area, with a suitable construction of the valve. According to an advantageous configuration, the setting angle of a fully opened first valve formed as a valve flap is greater than 90°. For the supply of ram air from the aircraft environment through the first valve, a setting angle greater than 90° is particularly favourable.

The ram air supplied into the first aircraft fuselage area through the first valve can be supplied from the first aircraft fuselage area to an air distribution system of the aircraft air-conditioning system. It is, however, also conceivable for the air to flow from the first aircraft fuselage area into the aircraft cabin directly through through-openings between the aircraft cabin and the first aircraft fuselage area. Furthermore, at least one recirculation fan and a mixing chamber of the aircraft air-conditioning system can be arranged in the first aircraft fuselage area. The at least one recirculation fan can be controlled during emergency ventilation operation such that it draws in air from the first aircraft fuselage area and supplies it to the mixing chamber. The air can be conveyed from the mixing chamber via the air distribution system into the aircraft cabin and thus supply the latter with the necessary breathable air. The recirculation fan thus assists the conveyance of air from the first aircraft fuselage area into the aircraft cabin. In the event of a fault of the recirculation fan, however, proper emergency ventilation is already guaranteed by the negative-pressure-driven emergency ventilation which has already been described.

The air can flow from the aircraft cabin via through-openings between the aircraft cabin and the second aircraft fuselage area into the second aircraft fuselage area and be discharged from there into the aircraft environment through the second valve. If the at least one recirculation fan in the first aircraft fuselage area is further away, along the aircraft longitudinal axis, from the aircraft nose than the first valve, a spatial separation between the first and second aircraft fuselage area can be dispensed with, since the operation of the recirculation fan produces a forced flow of the air from the first aircraft fuselage area into the aircraft cabin, and consequently a direct air flow from the first into the second aircraft fuselage area without passing through the cabin to be ventilated is at least largely prevented.

In a preferred embodiment of the method according to the invention, an electronic control unit can detect, on the basis of signals supplied to the electronic control unit, a malfunction of a system which during normal operation ensures ventilation of the aircraft cabin and/or control of the cabin internal pressure. In response to the detection of such a malfunction, the electronic control unit can control the operation of the first and/or the second valve and/or the recirculation fan, for carrying out the method for emergency ventilation of the aircraft cabin. The electronic control unit can be, for example, a control unit which during normal operation controls the air outlet valves of the cabin pressure control system for controlling the cabin internal pressure.

The electronic control unit can automatically control the operation of the first and/or second valve and/or the recirculation fan in response to the detection of a malfunction of the system which during normal operation ensures ventilation of the aircraft cabin, for carrying out the method for emergency ventilation of the aircraft cabin. That is to say the control and operation of the first and second valves serving during normal operation as air outlet valves switches over automatically from pressure-maintaining priority to emergency ventilation during the descent, without an intervention of a pilot being necessary. Owing to the automatic switch-over from pressure-maintaining priority to emergency ventilation, therefore, no additional switch needs to be provided in the cockpit. There is thus no danger either of switching over to emergency ventilation operation too late or not at all, owing to human error, because appropriate action of the pilot does not take place.

The signals which are supplied to the electronic control unit and on the basis of which the automatic switch-over from pressure-maintaining priority to emergency ventilation takes place can be delivered by sensors and equipment connected to the control unit.

In an advantageous configuration, the sensors can also serve for monitoring the operation of individual air-conditioning system components. The sensors can monitor, for example, the air generation units and/or components of the air distribution system, without which sufficient ventilation of the aircraft cabin is not possible, and in the event of a fault emit appropriate signals. The emergency ventilation operation can thus be initiated early, even during the descent.

The present invention further relates to a system for emergency ventilation of an aircraft cabin. This system comprises a first valve arranged in a first aircraft fuselage area and a second valve arranged in a second aircraft fuselage area. The first and the second valve serve in their normal operation as air outlet valves of an aircraft cabin pressure control system. The first and the second aircraft fuselage area are spaced apart from one another along a longitudinal axis of the aircraft. In addition, the system comprises an electronic control unit which is adapted to control the first and the second valve in accordance with the emergency ventilation operation. The control of the valves takes place such that air is supplied from the aircraft environment into the first aircraft fuselage area through the opened first valve and is conducted from the first aircraft fuselage area into the aircraft cabin. The air from the aircraft cabin can be conducted on into the second aircraft fuselage area and be discharged into the aircraft environment through the opened second valve. As a result, the negative-pressure-driven emergency ventilation of the aircraft cabin which has already been described takes place.

The emergency ventilation method according to the invention is based on the control of components of the cabin pressure control system which are present in an aircraft anyway. Similarly, the emergency ventilation system according to the invention comprises components of the cabin pressure control system. The system according to the invention consequently ensures emergency ventilation of the aircraft cabin without the need for additional components. The components of the cabin pressure control system have high reliability owing to their safety relevance, so that the emergency ventilation system according to the invention is also distinguished by high system reliability. Since components of the cabin pressure control system are resorted to, the weight of the aircraft is not additionally increased. Likewise, no additional electrical energy is required. Moreover, the installation expenditure on emergency ram-air inlets, their pipework and driving is completely eliminated.

The electronic control unit can be adapted to control the first valve such that it is completely opened. Furthermore, it can be adapted to control the second valve such that it is at least partly opened.

Furthermore, the electronic control unit of the emergency ventilation system according to the invention can be adapted to control at least one recirculation fan of an aircraft air-conditioning system, which fan in its normal operation draws in air from the aircraft cabin and supplies it to a mixing chamber of an aircraft air-conditioning system, such that the recirculation fan draws air, supplied from the aircraft environment into the first aircraft fuselage area through the opened first valve, into the mixing chamber of the aircraft air-conditioning system and conveys it from the mixing chamber into the aircraft cabin.

In a further configuration of the emergency ventilation system according to the invention, the electronic control unit can be adapted to detect, on the basis of signals supplied to the electronic control unit, a malfunction of a system for ventilation of the aircraft cabin, and in response to the detection of such a malfunction and the flight status to control the operation of the first and/or the second valve and/or the recirculation fan, for carrying out the method for emergency ventilation of the aircraft cabin.

Finally, the electronic control unit of the emergency ventilation system can be adapted to automatically control the operation of the first and/or the second valve and/or the recirculation fan in response to the detection of a malfunction of a system for ventilation of the aircraft cabin, for carrying out the method for ventilation of the aircraft cabin.

BRIEF DESCRIPTION OF THE DRAWING

The method and system for emergency ventilation of an aircraft cabin according to the invention is explained in detail below with reference to the attached schematic FIGURE which shows an aircraft with air outlet valves of an aircraft cabin pressure control system which are controlled during emergency ventilation operation.

DETAILED DESCRIPTION

An aircraft 10, illustrated in the FIGURE, comprises first valves 14 arranged in the area of its skin 12 and second valves 16 likewise arranged in the area of the aircraft skin 12. The valves 14, 16 serve as air outlet valves of a cabin pressure control system of the aircraft 10 in their normal operation. The first and second valves 14, 16 are formed as valve flaps. The pivot axes 18, 20 of the first and second valves 14, 16 correspond to the valve flap centre axes and run perpendicularly to an aircraft longitudinal axis 22.

The first valves 14 are comprised in a first aircraft fuselage area 28. The first aircraft fuselage area 28 is arranged in an underfloor area 30 of the aircraft 10. A recirculation fan 32 and a mixing chamber 34 of an aircraft air-conditioning system are arranged in the first aircraft fuselage area 28. The underfloor area 30 of the aircraft 10 further comprises a second aircraft fuselage area 38. The latter is spaced apart from the first aircraft fuselage area 28 relative to the longitudinal axis 22. The second aircraft fuselage area 38 is situated in a section of the underfloor area 30 adjacent to a tail 40 of the aircraft 10, while the first aircraft fuselage area 28 is situated in a section of the underfloor area 30 adjacent to the aircraft nose 26. According to the exemplary embodiment illustrated in the FIGURE, the first and the second aircraft fuselage area 28, 38 are spatially separated from one another by a centre wing box 42. The second valves 16 are arranged in an area of the skin 12 surrounding the second aircraft fuselage area 38.

During emergency ventilation operation of the aircraft 10, as illustrated in the FIGURE, a setting angle of the first valves 14 relative to the aircraft skin 12 is 90°. When the aircraft is flying, valve flap sections, protruding into the aircraft environment, of the opened first valves 14 form a resistance to the air of the aircraft environment. Ram air thus collects at the protruding valve flap sections of the first valves 14 and a local positive pressure arises. This air passes through inlet openings 24, which are freed by the opened first valves 14 in their 90° open position relative to the longitudinal axis 22 of the aircraft 10 in the direction of an aircraft nose 26, into a first aircraft fuselage area 28.

During emergency ventilation operation, the recirculation fan 32 is controlled in such a way that the ram air supplied through the opened first valves 14 to the first aircraft fuselage area 28 is drawn in and supplied to the mixing chamber 34. The air from the mixing chamber 34 is then distributed in an aircraft cabin 36 via an air distribution system.

The air distributed in the aircraft cabin 36 flows via through-openings 44, provided between the aircraft cabin and the underfloor area 30, into the second aircraft fuselage area 38. This occurs owing to a negative pressure prevailing in the second aircraft fuselage area 38. This negative pressure arises from the fact that during emergency ventilation operation the second valves 16 are at least partly opened and enclose an acute setting angle with the aircraft skin 12, so that a local negative pressure arises and air passes from the second aircraft fuselage area 38 through the opened second valves 16 out into the aircraft environment. Emergency ventilation of the aircraft cabin 36 is thus effected by the first and second valves 14, 16, which during normal operation serve as air outlet valves of the cabin pressure control system of the aircraft 10.

The first and second valves 14, 16 and the recirculation fan 32 are controlled by an electronic control unit 46. The electronic control unit 46 receives, from sensors and equipment not shown in the FIGURE, signals which indicate a malfunction of the system which during normal operation of the aircraft ensures ventilation of the aircraft cabin 36. In response to the detection of such a malfunction and the flight status, the electronic control unit 46 controls the operation of the first and second valves 14, 16 and the recirculation fan 32 in such a way that, as shown in the FIGURE, emergency ventilation of the aircraft cabin 36 takes place. The control of the emergency ventilation operation by the electronic control unit 46 takes place automatically, i.e. without an appropriate intervention or command of the pilot.

The invention claimed is:

1. A method for emergency ventilation of an aircraft cabin of an aircraft, the aircraft located in an external aircraft environment, the method comprising:

controlling at least one first valve, the first valve being arranged in a first aircraft fuselage area in the underfloor area, such that during normal operation the first valve serves as an air outlet valve of an aircraft cabin pressure control system, such that air from inside the aircraft cabin is conducted to the first aircraft fuselage area of aircraft and is discharged into the external aircraft environment through the opened first valve, and such that during an emergency ventilation operation the first valve serves as an air inlet valve such that air is supplied from the external aircraft environment into the first aircraft fuselage area through the opened first valve and is conducted from the first aircraft fuselage area into the aircraft cabin;

controlling at least one second valve, the second valve being arranged in a second aircraft fuselage area in the underfloor area spaced apart from the first aircraft fuselage area along a longitudinal axis of the aircraft, such that during the normal operation and during the emergency ventilation operation the second valve serves as an additional air outlet valve of the aircraft cabin pressure control system, such that air is conducted from the aircraft cabin into the second aircraft fuselage area and is discharged into the external aircraft environment through the opened second valve; and controlling at least one recirculation fan of an aircraft air-conditioning system, such that during the normal operation the recirculation fan draws in air from the aircraft cabin and supplies the air to a mixing chamber of the aircraft air-conditioning system, and such that during the emergency ventilation operation the recirculation fan directly draws ram air, supplied from the external aircraft environment into the first aircraft fuselage area through the opened first valve, into the mixing chamber of the aircraft air-conditioning system and conveys the ram air from the mixing chamber into the aircraft cabin.

2. The method according to claim 1, wherein during the emergency ventilation operation the first valve is controlled to a fully opened position, so that ram air is supplyable from the external aircraft environment into the first aircraft fuselage area through the fully opened first valve, and wherein the second valve is controlled to an at least partly opened position.

3. The method according to claim 1, wherein an electronic control unit detects, on the basis of signals supplied to the electronic control unit, a malfunction of a ventilation system which during normal operation ensures ventilation of the aircraft cabin, and in response to the detection of such a malfunction controls the operation of at least one of the first valve, the second valve and the recirculation fan.

4. The method according to claim 3, wherein the electronic control unit automatically controls the operation of at least one of the first valve, the second valve and the recirculation fan in response to the detection of a malfunction of the ventilation system as the emergency venting operation.

5. A system for emergency ventilation of an aircraft cabin of an aircraft, the aircraft located in an external aircraft environment, the system comprising:

a first valve, arranged in a first aircraft fuselage area in the underfloor area, the first valve during normal operation serving as an air outlet valve of an aircraft cabin pressure control system such that air from inside the aircraft cabin is conducted to the first aircraft fuselage area of aircraft and is discharged into the external aircraft environment through the opened first valve;

a second valve, arranged in a second aircraft fuselage area in the underfloor area, the second valve during normal operation serving as an additional air outlet valve of the aircraft cabin pressure control system, the first and the second aircraft fuselage areas being spaced apart from one another along a longitudinal axis of the aircraft; and an electronic control unit which is adapted to control the first valve and the second valve such that during an emergency venting operation air is supplied from the external aircraft environment into the first aircraft fuselage area through the opened first valve and is conducted from the first aircraft fuselage area into the aircraft cabin, and such that air is conducted from the aircraft cabin into the second aircraft fuselage area and is discharged into the external aircraft environment through the opened second valve, the electronic control unit being further adapted to control at least one recirculation fan of an aircraft air-conditioning system, the recirculating fan during normal operation drawing in air from the aircraft cabin and supplying the air to a mixing chamber of an aircraft air-conditioning system, and such that during the emergency venting operation the recirculation fan draws ram air, supplied from the external aircraft environment into the first aircraft fuselage area through the opened first valve, into the mixing chamber of the aircraft air-conditioning system and conveys the ram air from the mixing chamber into the aircraft cabin.

6. The system according to claim 5, wherein the electronic control unit is further adapted during the emergency venting operation to control the first valve to a fully opened position, so that ram air is supplyable from the external aircraft environment to the first aircraft fuselage area through the fully opened first valve, and wherein the electronic control unit is further adapted to control during the emergency venting operation the second valve to an at least partly opened position.

7. The system according to claim 5, wherein the electronic control unit is further adapted to detect, on the basis of signals supplied to the electronic control unit, a malfunction of a system for ventilation of the aircraft cabin, and in response to the detection of such a malfunction to control the operation of at least one of the first valve, the second valve and the recirculation fan.

8. The system according to claim 7, wherein the electronic control unit is further adapted to automatically control the operation of at least one of the first valve, the second valve and the recirculation fan in response to the detection of a malfunction of the system for ventilation of the aircraft cabin as the emergency venting operation.

\* \* \* \* \*